March 31, 1964

J. A. NIETO, JR 3,127,040

BALED HAY LOADER

Filed Oct. 5, 1961

Joe A. Nieto, Jr.
INVENTOR.

BY
Attorneys

March 31, 1964 J. A. NIETO, JR 3,127,040
BALED HAY LOADER
Filed Oct. 5, 1961 3 Sheets-Sheet 2

Joe A. Nieto, Jr.
INVENTOR.

March 31, 1964  J. A. NIETO, JR  3,127,040
BALED HAY LOADER
Filed Oct. 5, 1961  3 Sheets-Sheet 3

Joe A. Nieto, Jr. INVENTOR.

BY *Clarence A. O'Brien*
*and Harvey B. Jackson*
Attorneys

United States Patent Office 3,127,040
Patented Mar. 31, 1964

3,127,040
BALED HAY LOADER
Joe A. Nieto, Jr., Rte. 2, Box 49, Roswell, N. Mex.
Filed Oct. 5, 1961, Ser. No. 143,121
8 Claims. (Cl. 214—501)

This invention relates to a novel and useful baled hay loader and comprises a wheeled trailer adapted to be pulled behind hay baling machinery. The hay bale loader is provided with a main frame that supports a bale receiving bin thereabove and an elongated longitudinally extending conveyor assembly is mounted on one side of the main frame of the trailer for swinging movement outwardly and upwardly from a lowermost position in order that bales of hay received on the conveyor assembly may be raised and inverted for discharge into the open top bin carried by the main frame of the trailer. The hay bale loader also includes a support table which is rotatably supported for oscillation about an upstanding axis and is disposed adjacent the forward end of the conveyor assembly when the latter is in a lowermost position for supporting the rear end of a discharge conveyor carried by the hay baler behind which the hay bale loader is being towed.

As bales of hay are discharged from the baling machinery along the discharge conveyor thereof, they are received onto the elongated conveyor assembly carried by the hay bale loader. After a predetermined number of bales of hay has been positioned on the conveyor assembly of the baled hay loader, the conveyor assembly is swung outwardly and upwardly to an inverted position above the upper edges of the bale receiving bin carried by the trailer.

Motor means for effecting swinging movement of the conveyor assembly is carried by the trailer and is actuatable by controls to be carried by the hay baling machinery behind which the trailer is being towed.

It is to be noted that the hay bale loader of the instant invention is constructed in a manner whereby it may be readily mounted on existing types of trailers provided with bins for receiving bales of hay and it will be further noted that the hay bale loader may be secured to a conventional type of trailer provided with a tiltable bin without the hay bale loader interfering with the tilting of the bin.

The main object of this invention is to provide a baled hay loader primarily designed for receiving bales of hay from hay baling machinery and for securement to a conventional type of bale receiving trailer in a manner whereby a plurality of bales discharged from hay baling machinery may be collected and then simultaneously lifted and dumped into the open top bin of a conventional type of trailer.

A further object of this invention, in accordance with the preceding object, is to provide a baled hay loader which may be towed behind hay baling machinery and utilized to intermittently raise and dump a plurality of bales discharged from the hay baling machinery into a bale receiving bin of a conventional type of trailer without requiring that the hay baling machinery or trailer being pulled thereby be momentarily stopped in order to afford sufficient time to carry out the hay bale dumping process.

Another object of this invention, in accordance with the preceding objects, is to provide a hay bale loader attachment for a conventional type of tilt body trailer which may be utilized to receive bales of hay from hay baling machinery while being towed behind the latter and is constructed in a manner whereby the hay bale loader will be positioned to receive bales of hay discharged from the hay baling machinery even when the hay baling machinery and trailer supporting the hay bale loader are executing a sharp turn.

A final object to be specifically enumerated herein is to provide a hay bale loader which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
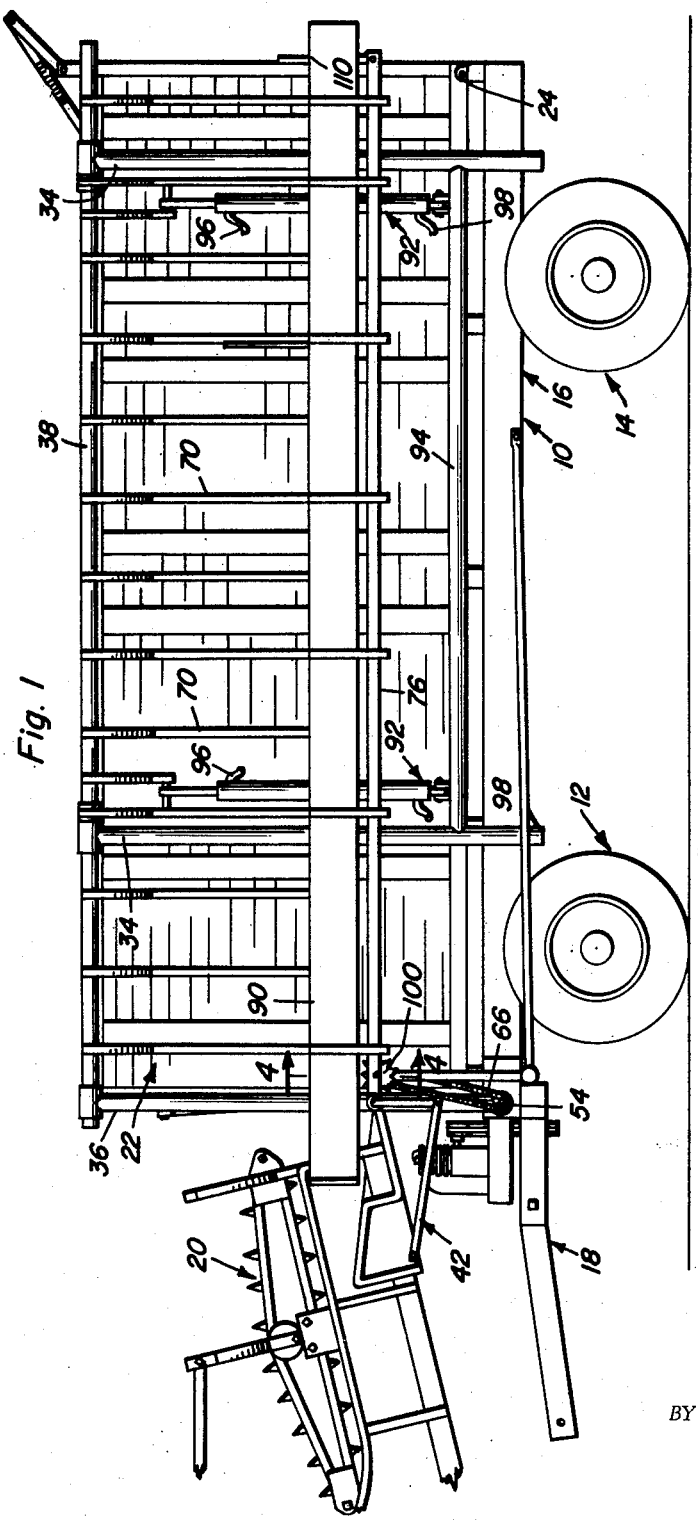
FIGURE 1 is a side elevational view of a conventional type of tilt body trailer shown with the hay bale loader of the instant invention mounted thereon.

Referring now more specifically to the drawings the numeral 10 generally designates a conventional type of farm trailer which is provided with a dirigible front wheeled supporting assembly generally referred to by the reference numeral 12 and a rear wheeled supporting assembly generally referred to by the reference numeral 14. The wheeled assemblies 12 and 14 are supported from a main frame generally referred to by the reference numeral 16 and it will be noted that the main frame 16 includes a drawbar assembly generally referred to by the reference numeral 18 adapted for securement to the rear end of a piece of hay baling machinery (not shown) for towing the trailer 10 behind the hay baling machinery.

With attention now directed to FIGURE 1 of the drawings it will be noted that the hay baling machinery may be provided with any suitable type of discharge conveyor such as that generally designated by the reference numeral 20 for discharging bales of hay from the hay baling machinery.

Figure 5:
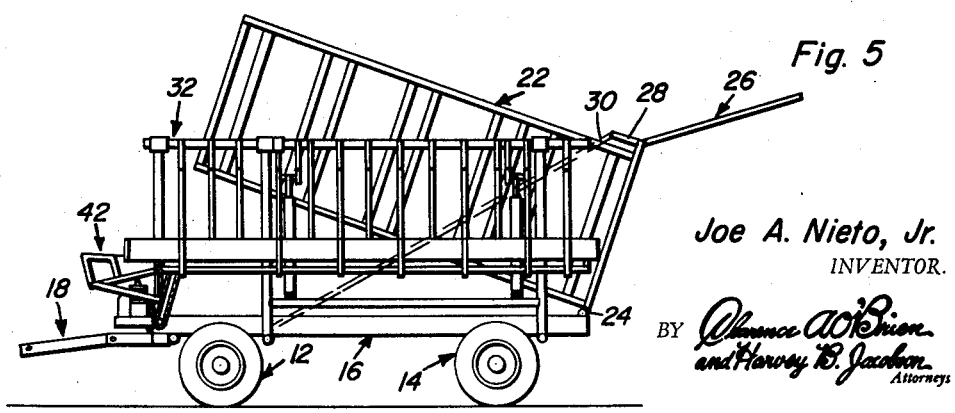
FIGURE 5 is a side elevational view of the embodiment illustrated in FIGURE 1 and on somewhat of a reduced scale showing the tiltable body bin of the trailer in a tilted dumping position.

It will be noted that the trailer 10 also includes an open top bin generally referred to by the reference numeral 22 and that the bin 22 is pivotally secured to the main frame 10 as at 24 for movement about a substantially horizontally disposed and transversely extending axis between the lowered position illustrated in FIGURE 1 and the raised dumping position illustrated in FIGURE 5.

A rear wall generally referred to by the reference numeral 26 is pivotally secured at its upper end to the rear of the bin 22 and is operatively connected to the frame 16 by means of a lever arm 28 and a connecting link or rod 30. From FIGURE 5 of the drawings it will be noted that the rear wall 26 is automatically swung to an open position upon tilting of the bin 22 relative to the main frame 16 toward the dumping position.

Figure 2:
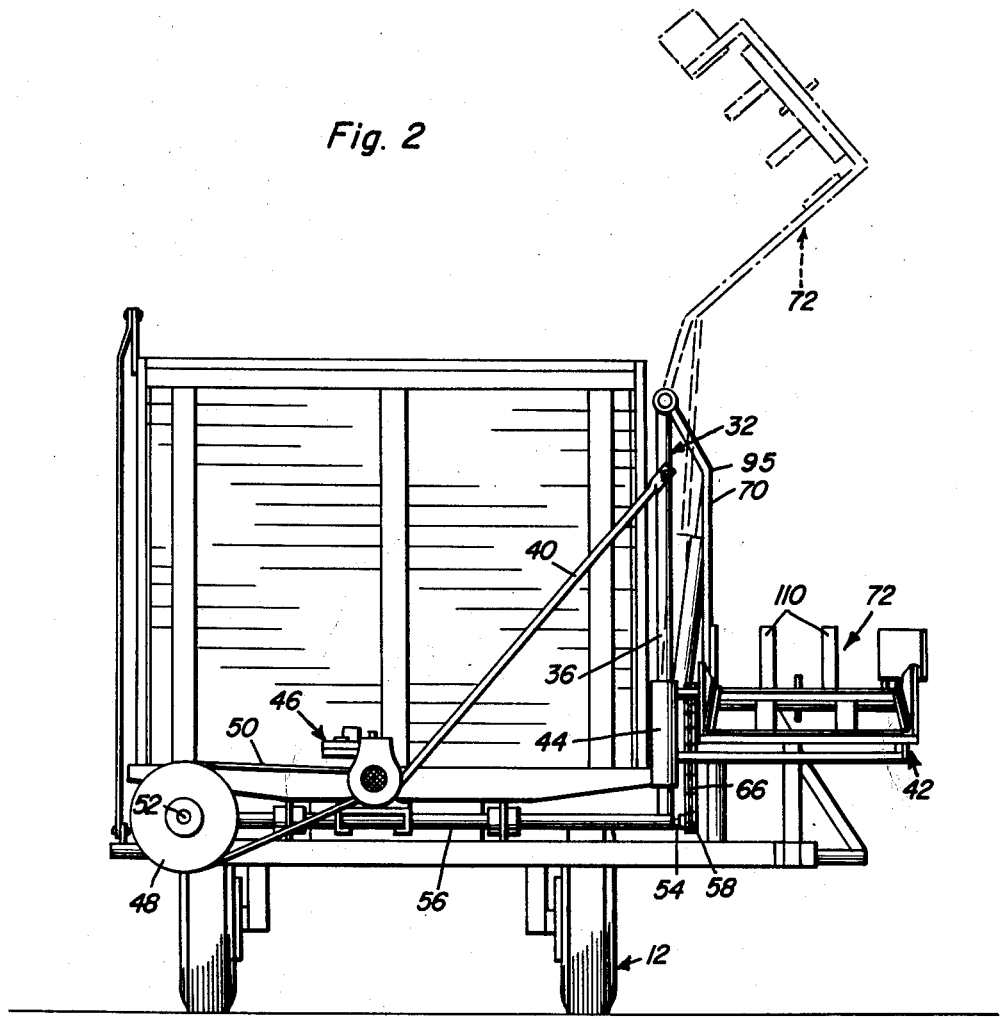
FIGURE 2 is an end elevational view of the embodiment illustrated in FIGURE 1 as seen from the left side of FIGURE 1.
Figure 3:
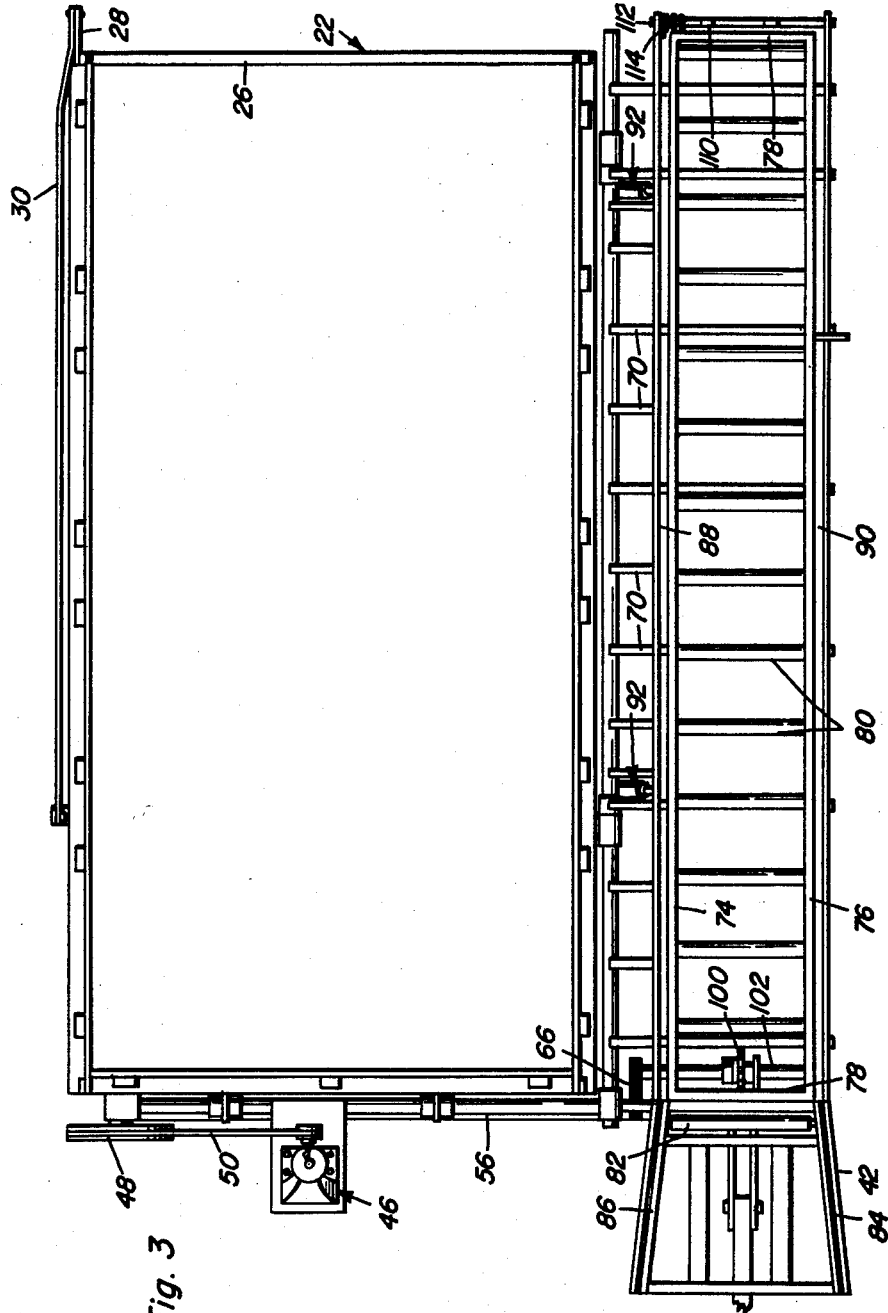
FIGURE 3 is a top plan view of the embodiment illustrated in FIGURE 1.

With attention now directed to FIGURES 1 through 3 of the drawings it will be noted that an upstanding framework generally referred to by the reference numeral 32 is secured to one side of the trailer 10 and is supported from the main frame 16. The framework 32 includes a plurality of uprights 34 and 36 which are interconnected at their upper ends by means of an upper horizontal support 38.

The framework 32 is provided with diagonal bracing 40, see FIGURE 2 for bracing the upper end of the framework 32 against lateral displacement relative to the bin 22 and it will be observed that a support table generally referred to by the reference numeral 42 is pivotally mounted on the upright support 36 by means of a sleeve 44 for movement about an upstanding axis. The support table 42 is adapted to have the rear end of the discharge conveyor generally referred to by the reference numeral 20 removably secured thereto in any convenient manner and it may be appreciated that the support table 42 is primarily designed to support the rear end of the discharge conveyor 20.

A prime mover generally referred to by the reference numeral 46 is secured to the forward end of the main frame 16 and is drivingly connected to a driven pulley 48 by means of an endless flexible belt 50. The driven pulley 48 is mounted on a shaft 52 for rotation therewith and the shaft 52 is drivingly connected to an intermediate shaft 54 journalled in the transversely extending housing 56 which is supported from the main frame 16.

The intermediate shaft 54 has a sprocket wheel 58 mounted thereon and a support assembly generally referred to by the reference numeral 60 is fixedly mounted on the frame 16 and includes a drive shaft 62 which is rotatably journalled thereby. The drive shaft 62, see FIGURE 4, has a sprocket wheel 64 mounted thereon and for rotation therewith and the sprocket wheels 58 and 64 are drivingly connected by means of an endless link chain 66. Accordingly, upon operation of the prime mover 46 it will be noted that the drive shaft 62 will be rotated. One end of the drive shaft 62 has a drive member 68 mounted thereon for a purpose to be hereinafter more fully set forth.

A plurality of support arms 70 are each rotatably journalled at one end on the horizontal support 38 for rotation about an axis extending along the longitudinal centerline of the support 38 and the lower ends of the arms 70 have a conveyor assembly generally referred to by the reference numeral 72 mounted thereon. From FIGURE 3 of the drawings it may be seen that the conveyor assembly 72 includes a pair of opposite side members 74 and 76 which are interconnected at opposite ends by means of transverse brace members 78.

A plurality of transversely extending rollers 80 are journalled for rotation between the side members 76, see FIGURE 3, and it will be noted that the support table 42 also includes a transversely extending roller 82 which is journalled between the opposite sides 84 and 86 of the support table 42.

As can best be seen from FIGURE 3 of the drawings it will be noted that the conveyor assembly 72 includes opposite sides 88 and 90 and it will be observed that a pair of extensible fluid motors generally referred to by the reference numerals 92 are pivotally secured between the lower support 94 which interconnects the upright supports 34 and 36 of the framework 32 and certain ones of the arms 70.

As can best be seen from FIGURE 2 of the drawings the arms 70 have portions 95 thereof disposed laterally of the plane passing through the pivotal connection of each arm with the horizontal support 38 and the connection of each free end of the arms 70 with the conveyor assembly 72. The upper ends of the extensible motors 92 are pivotally secured to the corresponding arms 70 at the portions 94 thereof.

It will be noted that each of the extensible motors 92 has a pair of fluid lines 96 and 98 communicated therewith and the lines 96 and 98 comprise fluid inlet and outlet lines respectively whose ends remote from the fluid motors 92 may be connected to any suitable source of fluid pressure (not shown) such as a hydraulic pressure system carried by the hay baling machinery behind which the trailer 10 is being towed.

It is to be understood that the hay baling machinery (not shown) will be provided with suitable controls for actuating the fluid motors 92.

Figure 4:
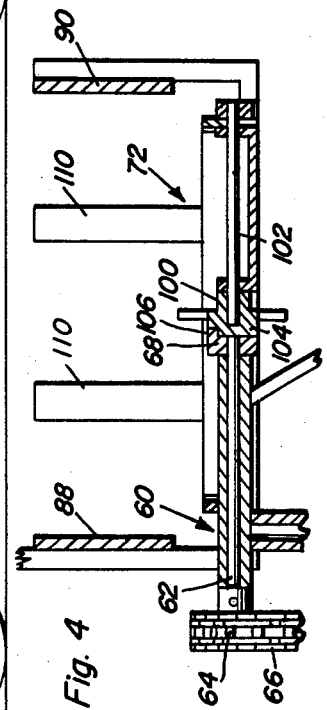
FIGURE 4 is an enlarged fragmentary vertical sectional view taken substantially upon the plane indicated by the section line 4—4 of FIGURE 1.

From FIGURE 4 of the drawings it will be noted that the conveyor assembly 72 includes rotary drive means in the form of a star wheel 100 which is mounted on a driven shaft 102 rotatably journalled in the conveyor assembly 72. The star wheel 100 and rotating drive means 68 include member in the form of interlocking portions 104 and 106 for drivingly connecting the drive shaft 62 to the driven shaft 102 upon swinging movement of the conveyor assembly 72 to its lowermost position illustrated in FIGURES 2 and 4. Accordingly, it will be noted that upon upward and outward swinging movement of the conveyor assembly 72 by the fluid motors 92 that the star wheel 100 will be disengaged from the rotating drive means 68. Thus, although the star wheel 100 is carried by the conveyor assembly 72 and the drive shaft 62 is fixedly supported from the frame 16, the star wheel 100 may be intermittently engaged with and disengaged from engagement with the rotating drive means 68 upon swinging movement of the conveyor assembly 72 to and from the lowermost position.

In operation, the trailer 10 is drawn behind any suitable type of hay baling machinery and the discharge conveyor 20 is utilized to move bales of hay from the hay baling machinery rearwardly and upwardly and onto the conveyor assembly 72 when it is in the lowered position in which the star wheel is drivingly connected to the prime mover 46. Accordingly, the star wheel 100 will engage bales of hay at the inlet end of the conveyor assembly 72 and urge the bales of hay rearwardly toward the stop arms 110 carried by the rear end of the conveyor assembly 72. The stop arms 110 are carried by a shaft 112 which is journalled between the sides 88 and 90 and a torsion spring 114 is provided for urging the arms 110 to the upright positions illustrated in FIGURES 2 and 3.

If too many bales of hay are positioned on the conveyor assembly 72 before an operator can actuate the fluid motors 92, the excess bales of hay will merely pivot the upper end of the arms 110 rearwardly and downwardly to enable the excess bales of hay to drop off the rear end of the conveyor assembly 72. However, it is to be understood that the conveyor assembly 72 may be easily supplied with a sensing mechanism (not shown) for automatically actuating the fluid motors 92 when a predetermined number of bales of hay are positioned on the conveyor assembly 72.

Each time the conveyor assembly 72 is pivoted to an uppermost position such as that illustrated in phantom lines in FIGURE 2 of the drawings, the bales of hay will slide down the arms 70 and into the open top of the bin 22. Then, when the bin is fully loaded, the bin 22 may be tilted upwardly at its forward end as illustrated in FIGURE 5 of the drawings which will result in the rear wall 26 being pivoted to the open position. When the bin 22 is thus positioned, the bales of hay collected therein may be dumped therefrom behind the trailer 10 as it is moving along.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A baled hay loader for receiving bales of hay from the outlet end of the discharge conveyor of a hay baler, said loader comprising an open top bin mounted on a wheeled main frame adapted to be towed behind a hay baler, a substantially horizontally disposed and longitudinally extending conveyor assembly disposed on one side of said main frame, means swingably mounting said conveyor assembly on said main frame for movement about a substantially horizontally disposed axis extending longitudinally of said frame between an upright lowermost bale receiving position extending alongside a lower portion of said bin and an upper inverted position above the top of said bin, said axis being disposed between upper and lower positions of said conveyor assembly, motor means operatively connected between said main frame and said conveyor assembly for selectively oscillating the latter, said conveyor assembly including rotating drive means adapted to engage a bale of hay received on the forward end of said conveyor assembly and to move said bale toward the rear end of said conveyor assembly, said main frame including driven drive shaft means including means for automatic releasable driving engagement with said drive means when said conveyor assembly is in the lower position and releasable from engagement with said drive means upon movement of said conveyor assembly from said lower position toward said upper position.

2. The combination of claim 1 including motor means carried by said main frame and drivingly connected to said drive shaft means.

3. A baled hay loader for receiving bales of hay from the outlet end of the discharge conveyor of a hay baler, said loader comprising an open top bin mounted on a wheeled main frame adapted to be towed behind a hay baler, a substantially horizontally disposed and longitudinally extending conveyor assembly disposed on one side of said main frame, means swingably mounting said conveyor assembly on said main frame for movement about a substantially horizontally disposed axis extending longitudinally of said frame between an upright lowermost bale receiving position extending alongside a lower portion of said bin and an upper inverted position above the top of said bin, said axis being disposed between upper and lower positions of said conveyor assembly, motor means operatively connected between said main frame and said conveyor assembly for selectively oscillating the latter, said conveyor assembly including rotating drive means adapted to engage a bale of hay received from the forward end of said conveyor assembly and to move said bale toward the rear end of said conveyor assembly, said main frame including driven drive shaft means including means for automatic releasable driving engagement with said drive means when said conveyor assembly is in the lower position and releasable from engagement with said drive means upon movement of said conveyor assembly from said lower position toward said upper position, a swingable rear wall on said bin pivotally mounted for movement about a generally horizontally disposed axis extending transversely of said bin and disposed adjacent the upper extremity of said rear wall, means operatively connected between said rear wall and said frame for swinging the lower extremity of said rear wall rearwardly and upwardly in response to tilting of said bin relative to said frame.

4. A baled hay loader for receiving bales of hay from the outlet end of the discharge conveyor of a hay baler, said loader comprising an open top bin mounted on a wheeled main frame adapted to be towed behind a hay baler, a substantially horizontally disposed and longitudinally extending conveyor assembly disposed on one side of said main frame, means swingably mounting said conveyor assembly on said main frame for movement about a substantially horizontally disposed axis extending longitudinally of said frame between an upright lowermost bale receiving position extending alongside a lower portion of said bin and an upper inverted position above the top of said bin, said axis being disposed between upper and lower positions of said conveyor assembly, motor means operatively connected between said main frame and said conveyor assembly for selectively oscillating the latter, said conveyor assembly including rotating drive means adapted to engage a bale of hay received on the forward end of said conveyor assembly and to move said bale toward the rear end of said conveyor assembly, said main frame including driven drive shaft means including means for automatic releasable driving engagement with said drive means when said conveyor assembly is in the lower position and releasable from engagement with said drive means upon movement of said conveyor assembly from said lower position toward said upper assembly, motor means carried by said main frame and drivingly connected to said drive shaft means, a swingable rear wall on said bin pivotally mounted for movement about a generally horizontally disposed axis extending transversely of said bin and disposed adjacent the upper extremity of said rear wall, means operatively connected between said rear wall and said frame for swinging the lower extremity of said rear wall rearwardly and upwardly in response to tilting of said bin relative to said frame.

5. A baled hay loader for receiving bales of hay from the outlet end of the discharge conveyor of a hay baler, said loader comprising an open top bin mounted on a wheeled main frame adapted to be towed behind a hay baler, a substantially horizontally disposed and longitudinally extending conveyor assembly disposed on one side of said main frame, means swingably mounting said conveyor assembly on said main frame for movement about a substantially horizontally disposed axis extending longitudinally of said frame between an upright lowermost bale receiving position extending alongside a lower portion of said bin and an upper inverted position above the top of said bin, said axis being disposed between upper and lower positions of said conveyor assembly, motor means operatively connected between said main frame and said conveyor assembly for selectively oscillating the latter, said conveyor assembly including rotating drive means adapted to engage a bale of hay received on the forward end of said conveyor assembly and to move said bale toward the rear end of said conveyor assembly, said main frame including driven drive shaft means including means for automatic releasable driving engagement with said drive means when said conveyor assembly is in the lower position and releasable from engagement with said drive means upon movement of said conveyor assembly from said lower position toward said upper assembly, said means swingably mounting said conveyor assembly from said frame including an upright framework carried by said one side of said frame outwardly of said bin, a plurality of support arms each pivotally secured to an upper portion of said framework at one end for movement about an axis extending longitudinally of said frame, said conveyor assembly being carried by and extending between the lower ends of said arms.

6. The combination of claim 5 wherein said arms are disposed between said bin and said conveyor assembly when the latter is disposed in its lower position.

7. The combination of claim 6 wherein said arms are spaced closely adjacent each other in order that they may comprise guiding support means for bales being dumped from said conveyor assembly as said arms are swung to positions with their free ends upwardly and outwardly inclined.

8. The combination of claim 7 wherein said motor means comprises extensible motor means pivotally secured at opposite ends to said framework and at least some of said arms a spaced distance from their pivotal connection to said framework.

References Cited in the file of this patent
UNITED STATES PATENTS

| | | |
|---|---|---|
| 1,262,159 | Barber | Apr. 9, 1918 |
| 1,385,909 | Faillace | July 26, 1921 |
| 2,201,088 | Hamon | May 14, 1940 |
| 2,575,729 | Radakovich | Nov. 20, 1951 |
| 2,796,162 | Bellingham | June 18, 1957 |
| 2,804,219 | Hewson et al. | Aug. 27, 1957 |
| 2,885,101 | Aldredge et al. | May 5, 1959 |